(12) United States Patent
Jenvey

(10) Patent No.: US 6,622,818 B2
(45) Date of Patent: *Sep. 23, 2003

(54) SOUND ATTENUATING DEVICE

(75) Inventor: Peter Lee Jenvey, Victoria (AU)

(73) Assignee: HRL Technology Pty Ltd. (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/508,327

(22) PCT Filed: Sep. 11, 1998

(86) PCT No.: PCT/AU98/00742

§ 371 (c)(1),
(2), (4) Date: Mar. 9, 2000

(87) PCT Pub. No.: WO99/13274

PCT Pub. Date: Mar. 18, 1999

(65) Prior Publication Data

US 2002/0050418 A1 May 2, 2002

(30) Foreign Application Priority Data

Sep. 11, 1997 (AU) ............................................. P09106

(51) Int. Cl.$^7$ ................................................ E04F 17/04
(52) U.S. Cl. ........................ 181/224; 181/248; 181/252; 181/257; 181/258; 181/292; 454/262; 454/906
(58) Field of Search ................................. 181/224, 247, 181/248, 252, 256, 257, 258, 292, 290; 454/262, 906

(56) References Cited

U.S. PATENT DOCUMENTS

| | | | | | |
|---|---|---|---|---|---|
| 1,833,143 | A | * | 11/1931 | Weiss | 181/42 |
| 2,826,261 | A | * | 3/1958 | Eckel | 181/42 |
| 2,916,101 | A | * | 12/1959 | Naman | 181/42 |

(List continued on next page.)

FOREIGN PATENT DOCUMENTS

| | | | | |
|---|---|---|---|---|
| AU | 16434 | | 7/1976 | |
| DE | 2630056 A1 | | 2/1977 | |
| DE | 0 236 810 A2 | | 2/1987 | |
| EP | 0165145 A1 | | 12/1985 | |
| EP | 0 445 431 | * | 9/1991 | ................. 181/256 |
| FR | 2543342 A1 | | 9/1984 | |
| FR | 2668539 A1 | | 4/1992 | |
| GB | 2016085 A | | 9/1979 | |
| JP | 357101235 | * | 6/1982 | ................. 454/906 |
| JP | 406109318 | * | 4/1994 | ................. 454/906 |

OTHER PUBLICATIONS

Munjal et al., "Effect of Protective Layer On The Performance Of Absorptive Ducts," 1997 Institute of Noise Control Engineering, Noise Control Eng. J., vol. 45, No. 1, 1997, Jan–Feb, pp. 14–18.

Fan Tech Q–Seal Rectangular Duct Silencer Technical Data Sheet (date unknown).

*Primary Examiner*—Robert E. Nappi
*Assistant Examiner*—Edgardo San Martin
(74) *Attorney, Agent, or Firm*—Wolf, Greenfield & Sacks, P.C.

(57) ABSTRACT

An improved sound attenuating device for use in a gas transportation duct, said device comprising a core of acoustically absorptive material substantially enclosed within an impervious film to prevent direct contact between the acoustically absorptive material and gas flowing through said gas transportation duct, wherein said enclosed absorptive material is maintained in position between at least two perforated facing plates and further wherein there is provided between the perforated facing and the impervious film and between the impervious film and the acoustically absorptive material spacing means to allow unrestricted movement of the impervious film in the void between the perforated facing and the acoustically absorptive material, while preventing contact between the film and the perforated facing and between the film and the acoustically absorptive material, and blocking means to impede the internal flow of gas between the film and the perforated facing and between the film and the acoustically absorptive material.

19 Claims, 2 Drawing Sheets

U.S. PATENT DOCUMENTS

| | | | | |
|---|---|---|---|---|
| 3,841,434 A | * | 10/1974 | Culpepper, Jr. | 181/36 R |
| 4,130,175 A | * | 12/1978 | Hehmann | 181/290 |
| 4,167,986 A | * | 9/1979 | Conway | 181/224 |
| 4,253,543 A | | 3/1981 | Johansson | |
| 4,266,602 A | * | 5/1981 | White et al. | 165/124 |
| 4,310,068 A | * | 1/1982 | Erskine | 181/290 |
| 4,569,471 A | | 2/1986 | Ingemansson et al. | 228/176 |
| 5,661,273 A | * | 8/1997 | Bergiadis | 181/290 |
| 5,696,361 A | * | 12/1997 | Chen | 181/224 |
| 5,992,560 A | * | 11/1999 | Matsuoka et al. | 181/252 |

\* cited by examiner

SOUND ATTENUATING DEVICE

FIELD OF THE INVENTION

The present invention relates to an improved sound-attenuating device. More particularly, but not exclusively, the invention relates to an improved sound attenuating device suitable for use in ventilation, air conditioning, exhaust, flue gas and other air or gas transportation ducts. This invention also has particular application in the hospital and food processing industries.

BACKGROUND OF THE INVENTION

Sound dampening of such gas transportation ducts can be achieved by use of acoustically absorptive material within the duct to absorb acoustic energy. One of the problems associated with the use of acoustically absorptive material in gas transportation ducts is that such material is susceptible to erosion or teasing out by the flow of gas through the duct. Similarly, contamination, clogging or other fouling of the acoustically adsorptive material may occur as a result of air borne particles present in the flow of gas through the duct. Accordingly, in known sound attenuating devices for use in gas transportation ducts, the acoustically absorptive material is typically protected by the combination of an outer perforated facing (usually of metal) and a thin inner protective layer. The inner protective layer can be a pervious fibrous material such as fibreglass cloth. In dusty environments, or where hygiene requires encapsulation of all fibres' the inner protective layer may comprise an impervious film to either prevent contamination of the absorptive material by gas borne dust or to prevent tearing out of the acoustically absorptive material.

For effective performance of the sound attenuating device where impervious film is used, neither the outer perforated facing nor the acoustic absorption material should be in direct contact with the protective film but rather there should be an air gap on both sides of it. These air gaps allow the film to move freely in response to acoustic forces generated by pressure waves in the gas allowing the sound to be transmitted more effectively into the acoustically absorptive material for increased attenuation. If the impervious layer is restricted from moving in response to acoustic pressure waves, sound is not transferred as efficiently into the absorptive material and the performance of the sound attenuating device is adversely affected. A further problem which may arise in known sound attenuating devices, occurs where a continuous internal air gap is provided between the outer perforated plate and the film. In these circumstances, the flow of gas through the gas transportation duct can result in the impervious film fluttering and generating its own noise. This fluttering is due to flow between the impervious film and the outer perforated facing.

According to known prior art sound attenuating devices, a spacing layer may be provided between the impervious film and the perforated facing. The spacing is included to prevent contact between the impervious film and the outer perforated facing so as to improve performance of the sound attenuating device. Spacing layers include highly porous cellular or honeycomb structured materials with a high thickness to cell size ratio. However, the known prior art suffers the disadvantage that the movement of the impervious film in response to acoustic forces is restricted, and so the transfer of sound into the absorptive material and sound attenuation is diminished.

In other applications, the prior art includes the use of concrete reinforcing weld mesh as a spacing layer between the impervious film and the outer perforated facing. With this method, the overlapping transverse bars of the mesh allow a continuous gas path between the impervious film and the outer perforated material thereby permitting internal flow along the length of the sound attenuating device and the consequent generation of noise by the flow passing between the impervious film and the transverse bars and between the transverse bars and the perforated facing.

SUMMARY OF THE INVENTION

It is accordingly an object of the present invention to provide in one embodiment a sound attenuating device for use in carrying air or gas laden with dust or other particulate matter and thereby provide a more efficient transmission of acoustic energy into an acoustically absorptive material and increased attenuation.

It is a further object of the present invention to provide in one embodiment a sound attenuating device which alleviates or at least minimises the risk of release of fibrous materials used for acoustic absorption which could pose a health risk or be a source of contamination in hospitals or during food preparation or processing.

It is a yet further object of the present invention to provide in one embodiment a sound attenuating device for use in gas transportation ducts which prevents or at least minimises the continuous internal air flow within the sound attenuating device thereby reducing noise generated by means of the flow interacting with the sound absorbing material, the impervious film, the spacer(s) and the outer perforated facing.

Through experimental testing, the applicant has found that the inclusion of regularly spaced transverse spacers between the perforated facing and the impervious film and between the sound absorbing material and the impervious film positioned at right angles to the flow of gas within a gas transportation duct, serve to substantially block internal longitudinal flow between the film and the perforated facing and between the film and the sound absorbing material thereby reducing the generation of acoustic energy caused by the flow of gas between the impervious film and the perforated facing and between the impervious film and the sound absorbing material.

The applicant has further found that increased sound attenuation is achieved if similar air gaps are provided adjacent to both sides of the impervious film to allow unrestricted movement of the film in the void between the perforated facing and the acoustically absorptive material in response to acoustic forces.

The present invention accordingly provides, in one embodiment, a sound attenuating device for use in a gas transportation duct, said device comprising a core of acoustically absorptive material substantially enclosed within an impervious film to prevent direct contact between the acoustically absorptive material and gas flowing through said gas transportation duct, said enclosed absorptive material being maintained in position between at least two perforated facing plates wherein there is provided between the perforated facing and the impervious film, spacing means to prevent contact between the film and the perforated facing and blocking means to impede the internal flow of air between the film and the perforated facing and wherein there is further provided between the impervious film and the acoustically absorptive material, spacing means to prevent contact between the film and the acoustically absorptive material and blocking means to impede the internal flow of gas between the film and the acoustically absorptive material and as a complete assembly to allow unrestricted movement of the impervious membrane in the void between the acoustically absorptive material and the perforated facing.

In a second embodiment of the present invention there is provided a sound attenuating device integrally formed with an internal surface of a gas transportation duct, said device comprising a core of acoustically absorptive material positioned between at least one internal surface of the duct and one or more perforated facing plates and said acoustically absorptive material being covered by an impervious film to prevent direct contact between the acoustically absorptive material and gas flowing through said gas transportation duct, and wherein there is provided between the perforated facing and the impervious film, spacing means to prevent contact between the film and the perforated facing and blocking means to impede the internal flow of air between the film and the perforated facing and wherein there is further provided between the impervious film and the acoustically absorptive material, spacing means to prevent contact between the film and the acoustically absorptive material and blocking means to impede the internal flow of gas between the film and the acoustically absorptive material and as a complete assembly to allow unrestricted movement of the impervious membrane in the void between the acoustically absorptive material and the perforated facing.

In one preferred aspect of the present invention the acoustically absorptive material comprises fibrous material which is totally encapsulated within an impervious layer to ensure there is no release of fibrous material which could pose a health risk or be a source of contamination during food preparation or processing.

BRIEF DESCRIPTION OF THE DRAWINGS

To further assist in the understanding of the present invention, a particularly preferred embodiment of the invention will now be described in relation to the drawings and photographs.

DETAILED DESCRIPTION

Figure 1:
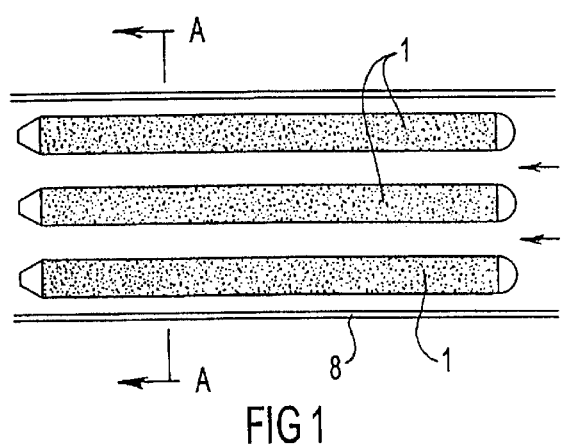
FIG. 1 is a longitudinal view of the sound attenuating devices of the present invention located within a gas transportation duct.
Figure 2:
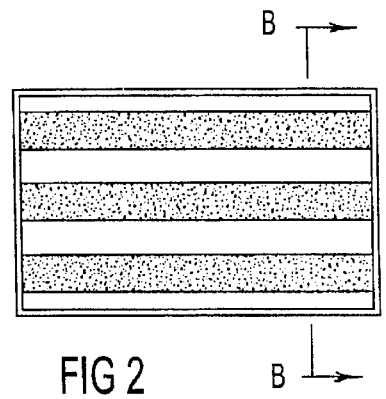
FIG. 2 is a cross-sectional view of the sound attenuating devices within the gas transportation duct taken across section A—A.
Figure 3:
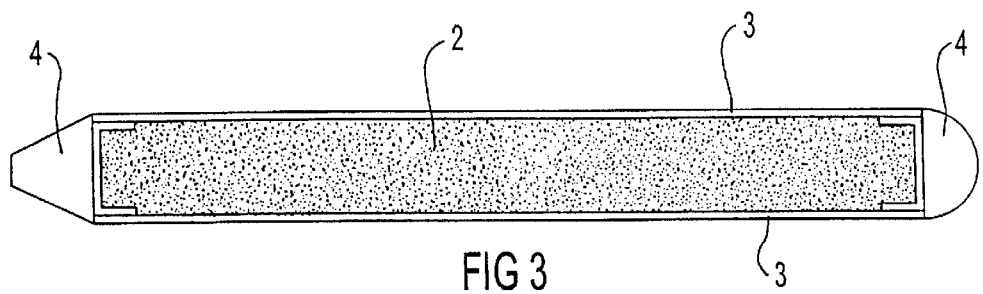
FIG. 3 is a longitudinal view of a single sound attenuating device according to the present invention.

As shown in the figures, the present invention provides a sound attenuating device (1) suitable for use in gas transportation ducting. In the illustrated embodiment, three sound attenuating devices are positioned within a gas transportation duct (8) orientated substantially parallel to the airflow as shown in FIG. 1.

According to the embodiment illustrated in the figures, the sound attenuating device (1) includes an acoustic insert assembly (2) located between two parallel perforated plates (3) and having contoured capping shells (4) positioned at either end of the acoustic insert assembly, said capping shells (4) being contoured to minimise pressure loss and noise generated as a result of aerodynamic resistance against the flow of air.

Figure 4:
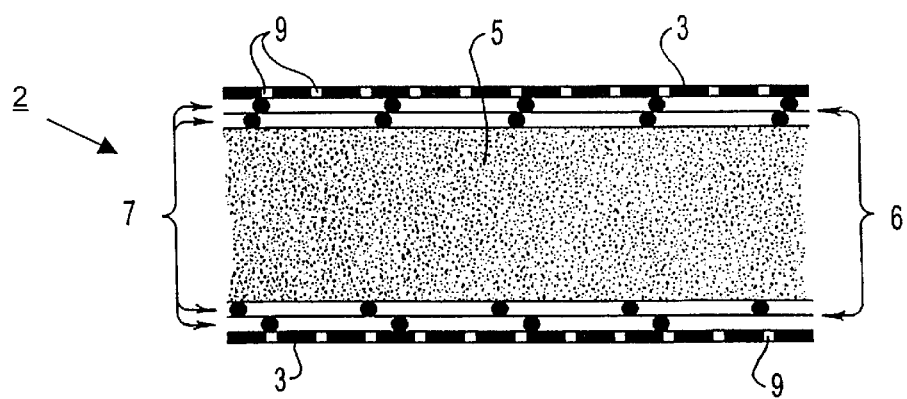
FIG. 4 is a cross-sectional view of a single sound attenuating device of FIG. 3 taken across section B—B of FIG. 2.

As shown in FIG. 4, the acoustic insert assembly (2) includes a block of acoustically absorptive material (5) enclosed within a layer of impervious film (6) and there is also provided a series of transverse spacers (7). These spacers (7) are located between both the perforated plate (3) and the impervious film (6) and between the acoustically absorptive material (5) and the impervious film (6). In one embodiment, at least some of the spacers are orientated substantially at right angles to the flow of gas within the transportation duct and at least some of the spacers are orientated substantially parallel to the flow of gas within the transportation duct. In the preferred embodiment, mineral wool, ceramic fibre and/or fibreglass insulation material has been found to be particularly suitable for use as the acoustically absorptive material (5). Further, in the preferred embodiment, film formed from polyethylene terephthalate has been found to be particularly suitable for enclosing the acoustically absorptive material. However, it is to be appreciated that there are other commercially available durable impervious films that may be equally suitable.

Figure 5:
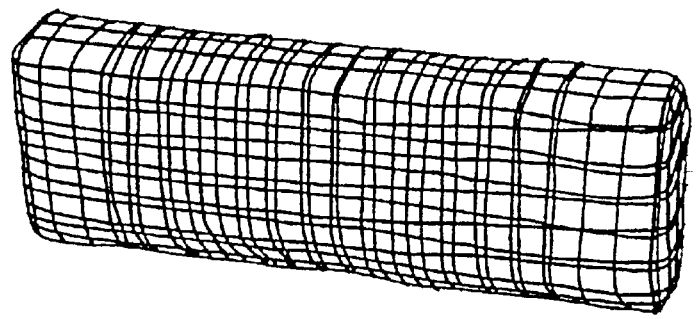
FIG. 5 is a photographic representation of the acoustic insert assembly.
Figure 6:
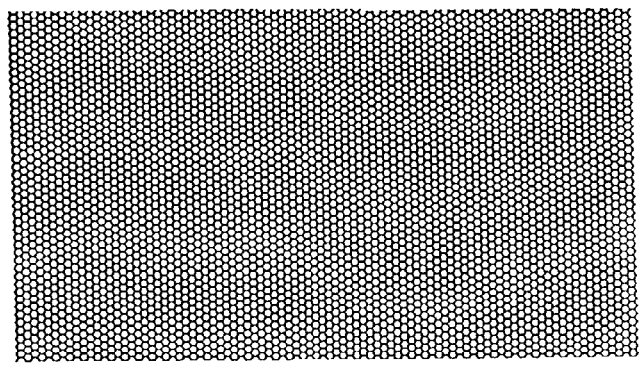
FIG. 6 is a photographic representation of the perforated facing plate.
Figure 7:
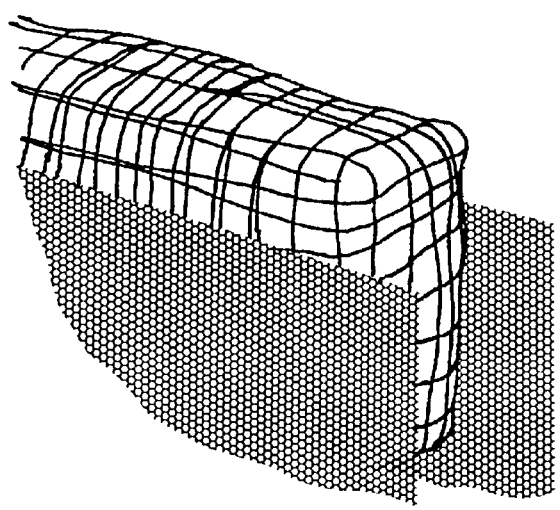
FIG. 7 is a photographic representation showing an expanded view of the acoustic insert assembly and the perforated facing.

The applicant has found a suitable spacer construction to be in the form of a soft, pliable plastic mesh as shown in FIGS. 5 to 7. The mesh shown in FIGS. 5 to 7 has a cross-sectional depth of approximately 4 mm and openings of 50 mm. However, it is to be appreciated that other configurations and dimensions may be used.

One advantage of using such mesh material is that the mesh is pliable to conform easily with the external shape of the absorptive material thus easing fabrication and providing an improved blocking means between the impervious film (6) and the perforated plate (3) and between the impervious film (6) and the sound adsorption material (5) to reduce all internal gas flow. Furthermore, in using such soft pliable plastic mesh the applicant has found the cut ends of the mesh are less likely to damage the impervious film than is the case if metal or hard plastic meshes are used.

In the preferred embodiment illustrated by the figures, the perforated plate is made of stainless steel having a thickness of 0.9 mm. In one embodiment, the perforated facing plate is from 0.5 mm to 3 mm thick. The perforated plate (3) has a plurality of regularly spaced holes (9) which in the preferred embodiment are 6.35 mm in diameter. In one embodiment, the holes are from 3 mm to 10 mm in diameter. It is been found by the applicant that in dusty environments, these large diameter holes minimise bridging and blockage of the holes by gas borne particles carried by the gas flow in the gas transportation duct (8). Also by spacing the impervious layer away from the perforated plate, the tendency of the perforations to block is further reduced.

Throughout the description and claims of the specification the word "comprise" and variations of the word, such as "comprising" and "comprises" is not intended to exclude other additives, components, integers or steps.

While it has been convenient to describe the invention herein in relation to a particularly preferred embodiment, it is to be appreciated that other constructions and arrangements are considered as falling within the scope of the invention. Various modifications, alterations, variations and/or additions to the constructions and arrangements described herein are also considered as falling with the scope and am bit of the present invention.

What is claimed is:

1. A sound attenuating device for use in a gas transportation duct, said device comprising a core of acoustically absorptive material substantially enclosed within an impervious film to prevent direct contact between the acoustically absorptive material and gas flowing through said gas transportation duct, said enclosed absorptive material being maintained in position between at least two perforated facing plates wherein there is provided between the perforated facing and the impervious film, spacing means to prevent contact between the film and the perforated facing and blocking means to impede the internal flow of air between the film and the perforated facing and wherein there is further provided between the impervious film and the acoustically absorptive material, spacing means to prevent contact between the film and the acoustically absorptive material and blocking means to impede the internal flow of gas between the film and the acoustically absorptive material and as a complete assembly to allow unrestricted movement of the impervious film in a void between the acoustically absorptive material and the perforated facing.

2. A sound attenuating device integrally formed with an internal surface of a gas transportation duct, said device comprising a core of acoustically absorptive material positioned between at least one internal surface of the duct and one or more perforated facing plates and said acoustically absorptive material being covered by an impervious film to prevent direct contact between the acoustically absorptive material and gas flowing through said gas transportation duct, and wherein there is provided between the perforated facing and the impervious film, spacing means to prevent contact between the film and the perforated facing and blocking means to impede the internal flow of air between the film and the perforated facing and wherein there is further provided between the impervious film and the acoustically absorptive material, spacing means to prevent contact between the film and the acoustically absorptive material and blocking means to impede the internal flow of gas between the film and the acoustically absorptive material and as a complete assembly to allow unrestricted movement of the impervious film in a void between the acoustically absorptive material and the perforated facing.

3. A sound attenuating device according to claim 2 integrally formed with an internal surface of a gas transportation duct wherein there is further provided one or more further sound attenuating device(s) the further sound attenuating device(s) comprising a core of acoustically absorptive material substantially enclosed within an impervious film to prevent direct contact between the acoustically absorptive material and gas flowing through said gas transportation duct, said enclosed absorptive material being maintained in position between at least two perforated facing plates wherein there is provided between the perforated facing and the impervious film, spacing means to prevent contact between the film and the perforated facing and blocking means to impede the internal flow of air between the film and the perforated facing and wherein there is further provided between the impervious film and the acoustically absorptive material, spacing means to prevent contact between the film and the acoustically absorptive material and blocking means to impede the internal flow of gas between the film and the acoustically absorptive material.

4. A sound attenuating device according to claim 1 or claim 2 wherein the acoustically absorptive material comprises a fibrous material.

5. A sound attenuating device according to claim 1 or claim 2 wherein the acoustically absorptive material is selected from the group comprising:
   i) mineral wool;
   ii) fibreglass;
   iii) ceramic fibres;
   iv) metallic fibre;
   v) acoustic foam; and
   vi) acoustic tiles.

6. A sound attenuating device according to claim 1 or claim 2 wherein at least some of the spacers are orientated substantially at right angles to the flow of gas within the transportation duct and at least some of the spacers are orientated substantially parallel to the flow of gas within the transportation duct.

7. A sound attenuating device according to claim 1 or claim 2 wherein the plurality of spacers are provided in the form of a mesh for wrapping around said acoustically absorptive material.

8. A sound attenuating device according to claim 7 wherein the mesh is a pliable plastic mesh having a cross-sectional depth about 4 mm and openings of about 50 mm.

9. A sound attenuating device according to claim 8 wherein the pliable plastic material is shaped to substantially conform with the shape of acoustically absorptive material.

10. A sound attenuating device according to claim 1 or claim 2 wherein the impervious film is a polymeric film.

11. A sound attenuating device according to claim 10 wherein the polymeric film is formed from polyethylene terephthalate.

12. A sound attenuating device according to claim 1 or claim 2 wherein the perforated facing plate comprises a perforated steel plate having a plurality of regularly spaced holes.

13. A sound attenuating device according to claim 12 wherein the perforated steel plate is a perforated stainless steel plate.

14. A sound attenuating device according to claim 12 wherein said perforated facing plate is from 0.5 mm to 3 mm thick.

15. A sound attenuating device according to claim 12 wherein said holes are from 3 mm to 10 mm in diameter.

16. A sound attenuating device according to claim 15 wherein said holes are about 6.5 mm in diameter.

17. A method of attenuating sound comprising positioning one or more sound attenuating devices according to claim 1 or claim 2 in a gas transportation duct so that the longitudinal axis of said sound attenuating device is substantially parallel to the direction of air flow through said gas transportation duct.

18. A sound attenuating device for use in a gas transportation duct, said device comprising:
   a core of acoustically absorptive material;
   an impervious film substantially enclosing the acoustically absorptive material to prevent direct contact between the acoustically absorptive material and gas flowing through said gas transportation duct, the impervious film having an inner side adjacent the acoustically absorptive material and an outer side opposite the inner side;

a perforated facing plate positioned on the outer side of the impervious film;

a first spacer positioned between the impervious film and the perforated facing plate, the first spacer constructed and arranged to prevent contact between the impervious film and the perforated facing plate; and a second spacer positioned between the impervious film and the acoustically absorptive material, the second spacer constructed and arranged to create a space between and prevent contact between the film and the acoustically absorptive material and to impede the flow of gas in the space between the film and the acoustically absorptive material.

19. The sound attenuating device of claim 18 wherein the first and second spacers allow unrestricted movement of the impervious film in a void between the acoustically absorptive material and the perforated facing.

* * * * *